(12) United States Patent
Tebo

(10) Patent No.: US 9,028,187 B2
(45) Date of Patent: May 12, 2015

(54) SYSTEM AND METHOD FOR DRIVING A FASTENER

(71) Applicant: Glenn J. Tebo, Kingston, NH (US)

(72) Inventor: Glenn J. Tebo, Kingston, NH (US)

( * ) Notice: Subject to any disclaimer, the term of this patent is extended or adjusted under 35 U.S.C. 154(b) by 0 days.

(21) Appl. No.: 13/927,654

(22) Filed: Jun. 26, 2013

(65) Prior Publication Data
US 2014/0161561 A1 Jun. 12, 2014

Related U.S. Application Data

(63) Continuation of application No. PCT/US2011/068077, filed on Dec. 30, 2011.

(60) Provisional application No. 61/428,506, filed on Dec. 30, 2010, provisional application No. 61/440,458, filed on Feb. 8, 2011.

(51) Int. Cl.
  *F16B 15/00* (2006.01)
  *F16B 15/06* (2006.01)
  *B25C 7/00* (2006.01)

(52) U.S. Cl.
  CPC ................. *F16B 15/00* (2013.01); *F16B 15/06* (2013.01); *B25C 7/00* (2013.01)

(58) Field of Classification Search
  USPC ........... 411/442, 443, 451.1, 451.3, 458, 465, 411/487, 488, 489, 490, 493
  See application file for complete search history.

(56) References Cited

U.S. PATENT DOCUMENTS

| 166,661 | A | * | 8/1875 | Van Wargenen | 411/442 |
|---|---|---|---|---|---|
| 457,582 | A | * | 8/1891 | Goldie | 411/489 |
| 471,658 | A | * | 3/1892 | Todd | 411/493 |
| 2,428,259 | A | * | 9/1947 | Anstett | 411/443 |
| 2,867,807 | A | * | 1/1959 | Anstett | 206/340 |
| 2,868,057 | A | * | 1/1959 | Anstett | 411/451.3 |
| 3,511,127 | A | * | 5/1970 | Gisondi | 411/487 |
| 3,717,067 | A | | 2/1973 | Vick et al. | |
| 3,882,755 | A | * | 5/1975 | Enstrom | 411/456 |
| 5,667,126 | A | | 9/1997 | Boucek | |
| 5,971,688 | A | * | 10/1999 | Anstett | 411/456 |
| 6,139,238 | A | * | 10/2000 | Anstett | 411/451.1 |
| 7,273,337 | B2 | * | 9/2007 | Lat et al. | 411/443 |
| 2004/0204254 | A1 | | 10/2004 | Coleman, Sr. | |
| 2004/0250504 | A1 | | 12/2004 | Leek et al. | |
| 2010/0213237 | A1 | | 8/2010 | Tebo | |

OTHER PUBLICATIONS

International Search Report and Written Opinion dated Apr. 17, 2012 issued in corresponding PCT Patent Application Serial No. PCT/US2011/068077.

* cited by examiner

*Primary Examiner* — Roberta Delisle
(74) *Attorney, Agent, or Firm* — Grossman, Tucker, Perreault & Pfleger, PLLC

(57) ABSTRACT

A system and method for positioning a tool. The system includes a base member configured to contact a first decking member and a second decking member; at least one base guide including a first end and an opposing second end, the first end coupled to the base member, the at least one base guide configured to position the base member relative to the first decking member and the second decking member; and an adjustable section coupled to the base member, the adjustable section configured to allow adjustment of at least one of a position and an angle of the tool relative to the base member. The system further includes a fastener configured to secure the first and/or second decking members to a joist.

19 Claims, 7 Drawing Sheets

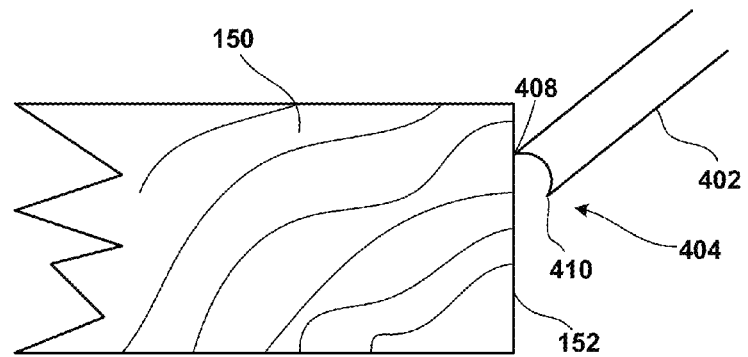
FIG. 4A
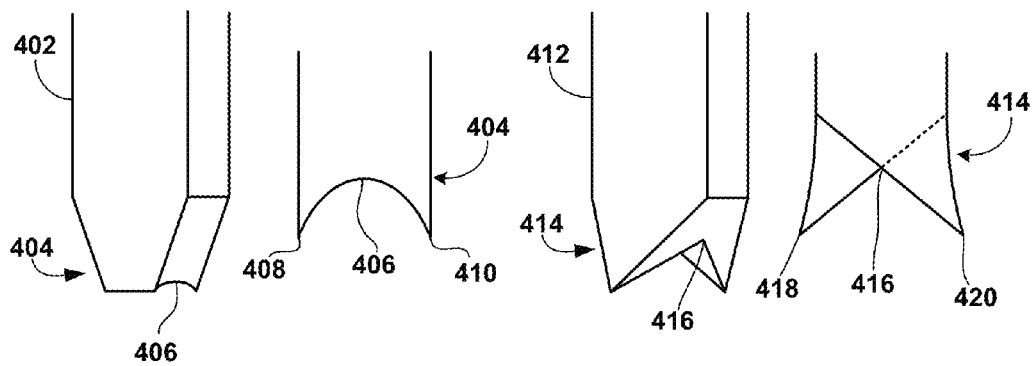
FIG. 4B
FIG. 4C
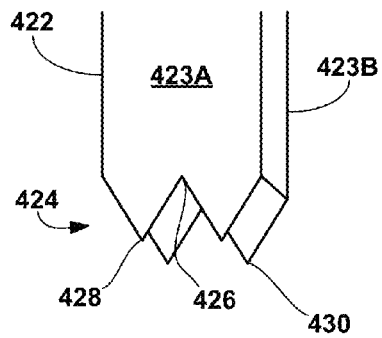
FIG. 4D
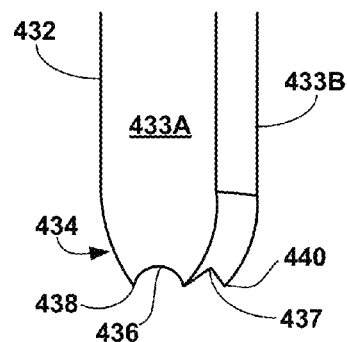
FIG. 4E

SYSTEM AND METHOD FOR DRIVING A FASTENER

CROSS-REFERENCE TO RELATED APPLICATIONS

This application is a continuation of International Patent Application No. PCT/US2011/068077, filed Dec. 30, 2011, designating the U.S. and claiming the benefit of U.S. Provisional Patent Application Ser. No. 61/428,506, filed Dec. 30, 2010, and U.S. Provisional Patent Application Ser. No. 61/440,458, filed Feb. 8, 2011, the entire disclosures of which are incorporated herein by reference.

FIELD

The present disclosure relates to fasteners, and, more particularly, to a system and method for driving a fastener.

BACKGROUND

A wide variety of fastener configurations for securing structural members to other members are known. In one example, a deck fastener may be used for securing decking members to associated joists in the construction of an exterior deck, or the like. It is desirable that deck fasteners be configured for securing decking members to associated joists without a fastener head protruding from a visible deck surface. It is also desirable to position a first decking member relative to an adjacent decking member, e.g., with a space (gap), between the first decking member and the adjacent decking member. The gap is configured to allow for and/or accommodate expansion and/or contraction of the decking members due to, for example, variations in environmental conditions, e.g., temperature and/or humidity. Deck fasteners may be driven into a decking member so that a head of the fastener is not visible from a deck top surface, e.g., by driving the deck fastener at an angle into an edge of a decking member and into an associated joist.

Fasteners may be driven into decking members using, e.g., a power fastening tool. The power fastening tool may be positioned at an angle relative to the decking member in order to drive the fastener, at an angle, into the edge of the decking member and into the associated joist. The gap may facilitate driving the fastener into the edge of the decking member. Some fasteners may not be sufficiently driven into the material for a variety of reasons. For example, some fasteners may lack sufficient strength or rigidity, such that, when driven into certain materials, the fastener may be prone to bending, possibly compromising the integrity of the connection structure members to one another. Additionally, some fasteners may not readily pierce certain materials (i.e. overcome initial resistance) due to the shape and/or design of the fastener, which may lead to difficulty in driving the fastener into the material, as well as damage to the material, such as, for example, splitting of wood. This may be particularly true in the case of some fasteners that have substantially flat and/or rectangular body portions and are collated into a magazine for use with the power fastening tool.

To achieve improved efficiency in driving the fasteners into the edge of the decking member at a desired angle, there is a need for an improved system and method for positioning a fastening tool relative to the decking member(s) and driving a fastener into the decking member(s).

BRIEF DESCRIPTION OF THE DRAWINGS

For a better understanding of the present invention, together with other objects, features and advantages, reference should be made to the following detailed description which should be read in conjunction with the accompanying figures, wherein:

FIG. 4A is a side view of one exemplary embodiment of a fastener being driven into a decking member, consistent with the present disclosure;

FIG. 4B is a perspective and profile view of the fastener of FIG. 4A;

FIG. 4C is a perspective and profile view of another exemplary embodiment of a fastener consistent with the present disclosure;

FIG. 4D is a perspective view of another exemplary embodiment of a fastener consistent with the present disclosure;

FIG. 4E is a perspective view of another exemplary embodiment of a fastener consistent with the present disclosure;

DETAILED DESCRIPTION

For ease of explanation, systems consistent with the present disclosure may be shown and described herein in connection a nail-type fastener. It will be recognized, however, a system and method consistent with the present disclosure will be useful in connection with a wide variety of fastener configurations. In addition, exemplary embodiments may be described herein in connection with fastening decking members to associated joists. It is to be understood, however, that a system and method consistent with the present disclosure may be useful in connection with fasteners configured for use with any type of material including wood, composite materials, concrete, metal, plastic, textiles and other materials. The exemplary embodiments described herein are thus provided only by way of illustration, and are not intended to be limiting.

Generally, the present disclosure relates to a tool positioning system and method configured for positioning a power fastener tool ("tool") for driving a fastener into an edge of a decking member to secure the decking member to an associated joist. For example, the power fastener tool may be power nailer (e.g., pneumatic, internal combustion and/or electric), a power stapler (e.g., pneumatic and/or electric) or another fastener system, e.g., screw fastener system, and may include a magazine of fasteners. The tool positioning system may include a base member, at least one base guide coupled to the base member and an adjustable section coupled to the base member. The adjustable section is configured to facilitate positioning and/or orienting the power fastener tool relative to the base member and/or a decking member. For example, the adjustable section may include at least one pivot member, e.g. pivot shaft, and a corresponding shaft guide.

Positioning may include translation of the power fastener tool relative to the base member. Orienting may include rotation of said power fastener tool relative to the base member. Rotation is configured to adjust a drive angle of a fastener relative to a decking member. Translation is configured to adjust a position of a nose of the power fastener tool in order to position the nose relative to the edge of the decking member, e.g., to position the fastener relative to the edge of the decking member and/or to release a safety mechanism to allow the tool to drive the fastener into the decking member.

Figure 1A:
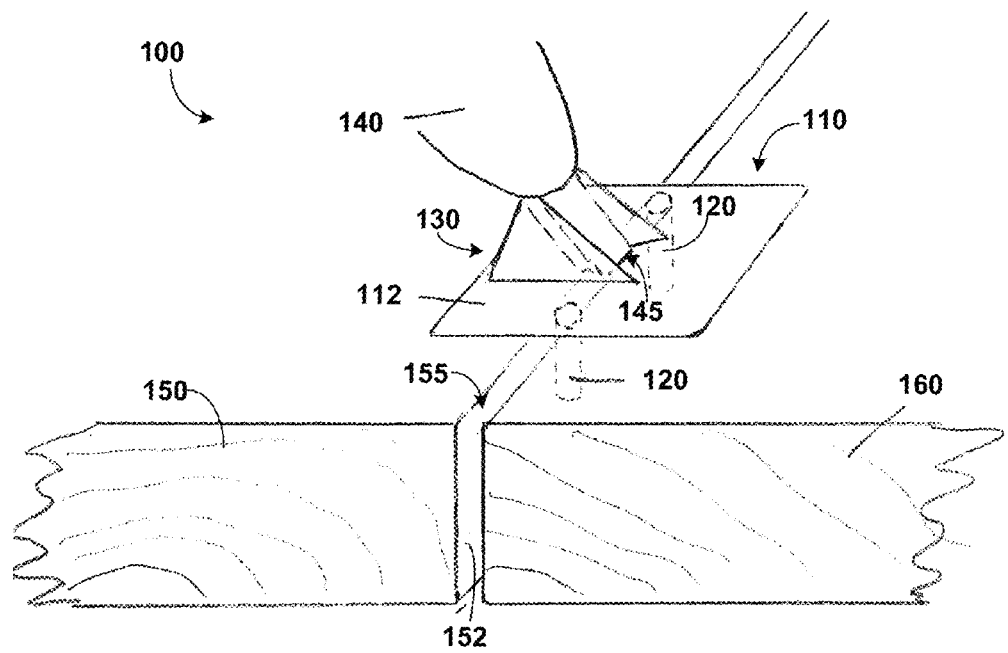
FIG. 1A is a sketch of one embodiment of a tool positioning system with a fixed angle consistent with the present disclosure.
Figure 1B:
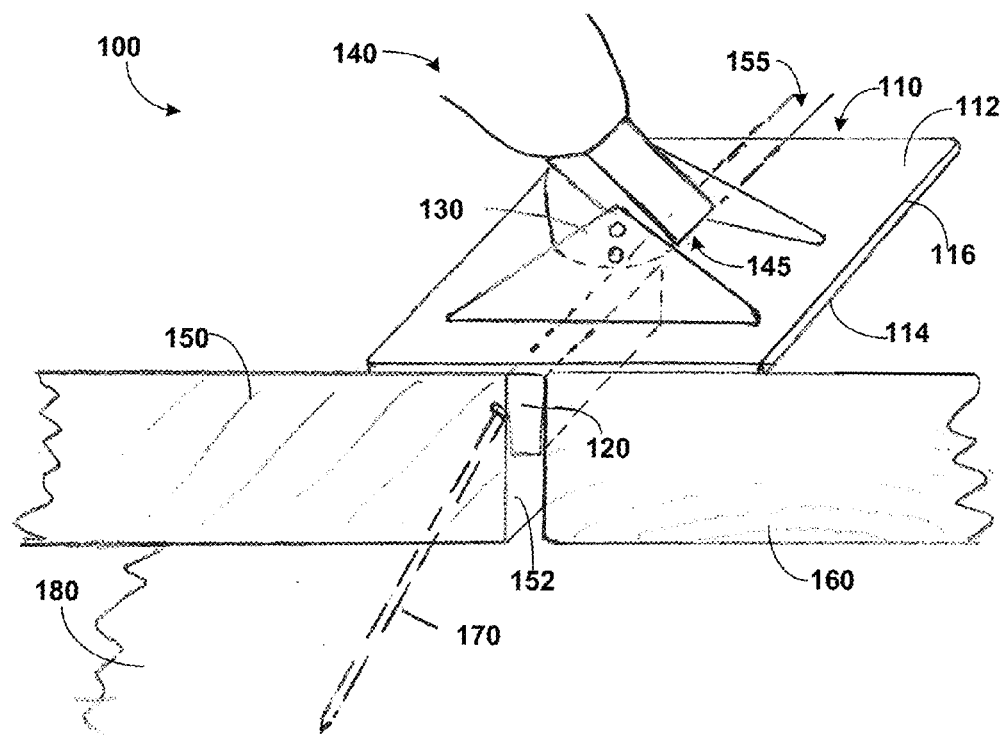
FIG. 1B is a sketch of another embodiment of a tool positioning system with an adjustable angle consistent with the present disclosure.
Figure 1C:
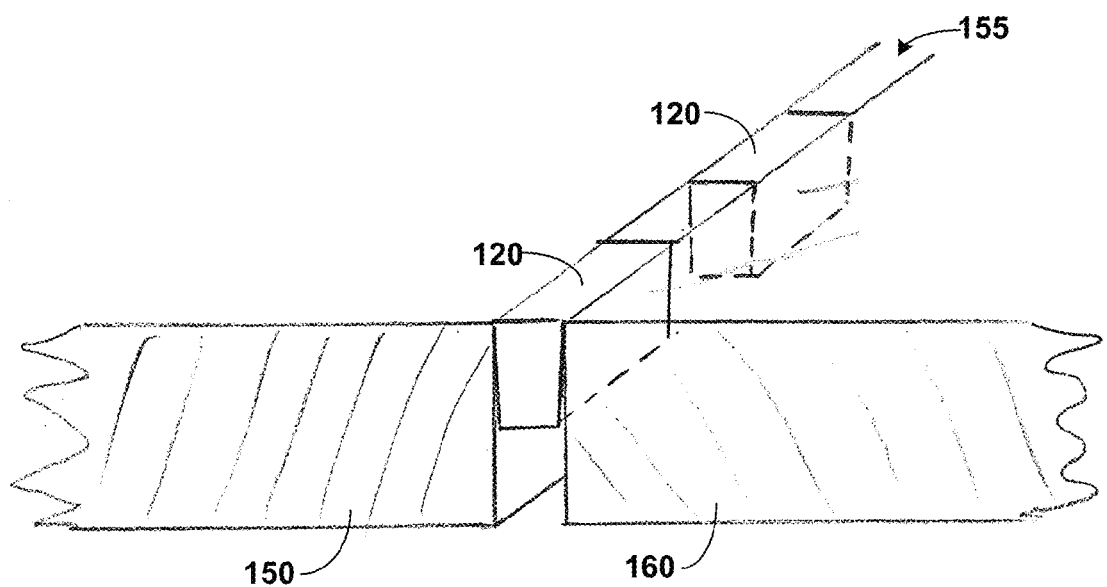
FIG. 1C is a sketch illustrating a plurality of base guides.

Turning to FIGS. 1A through 1C, there is illustrated sketches of exemplary embodiments of a tool positioning system 100 consistent with the present disclosure. The exemplary systems 100 include a base member 110, at least one base guide 120 coupled to the base member 110 and an adjustable section 130 coupled to the base member 110. A tool 140 may be coupled to the adjustable section 130.

The base member 110 may include a first surface 112, a second surface 114 and at least one side 116. The first surface 112 and the second surface 114 may be generally planar. The first surface 112 may be generally parallel to the second surface 114. The side 116 may be generally perpendicular to the first surface 112 and the second surface 114. The second surface 114 may contact a first decking member 150 and/or a second decking member 160, adjacent the first decking member 150, when the tool positioning system 100 is in place, e.g., in preparation for driving one or more fasteners into the decking member(s). The first surface 112 may then correspond to a top surface and the second surface 114 may then correspond to a bottom surface of the base member 110.

For example, the base member 110 may be generally rectangular, i.e., the first surface 112 and the second surface 114 may be generally rectangular. The base member 110 may have a width in a range of about one inch to about 8 inches. The base member 110 may have a length in a range of about one inch to about 8 inches. The base member 110 may define an opening configured to receive a tool nose 145, i.e., a discharge end of the tool 140, as described herein.

At least one base guide 120 may be coupled to the second (bottom) surface 114 of the base member 110. The base guide(s) 120 are configured to position the tool positioning system 100 relative to the decking members 150, 160. The base guide(s) 120 are configured to provide and/or fit into a space ("gap") 155 between the first decking member 150 and the second decking member 160, adjacent the first decking member 150. The base guide(s) 120 may facilitate positioning the tool positioning system 100 relative to the decking member(s) and may inhibit movement of the tool positioning system 100, e.g., when a fastener 170 is driven into a decking member.

The base guide(s) 120 may have a first end coupled to the base member 110 and an opposing second end. In some embodiments, at least a portion of the base guide 120 adjacent the second end may be tapered to facilitate inserting the base guide 120 into the gap 155 between the decking members 150, 160. In an embodiment with a plurality of base guides 120, the adjustable section 130 may be positioned generally between at least two of the plurality of base guides 120. This configuration may provide relatively stable support for the tool positioning system 100 on the decking members.

For example, the base guide(s) 120 may be generally cylindrically shaped, i.e., may have a generally circular cross section. In another example, the base guide(s) 120 may be generally rectangular shaped, i.e., may have a generally rectangular cross-section. A dimension of the base guide cross-section, corresponding to the gap 155 between the first decking member 150 and the second decking member 160, may be in a range of about 0.062 inches to about one inch. Although cylindrical and rectangular shapes have been described, consistent with the present disclosure, the base guide(s) are not limited to these shapes.

The adjustable section 130 is configured to provide translation and, in some embodiments, rotation of the tool nose 145 relative to the base member 110, e.g., relative to the second (bottom) surface 114 of the base member 110 and, thereby relative to the first 150 and second 160 decking members. As shown, for example, in FIG. 1B, a fastener 170 may be driven into an edge 152 of a decking member, e.g., the first decking member 150, and into an associated joist 180. In order to drive the fastener 170 into the edge 152 of the decking member, the tool nose 145 may be positioned at least partially in the gap 155 and at an angle relative to a perpendicular defined relative to a surface of the joist 180. The surface of the joist may be generally parallel to the first 112 and/or second surface 114 of the base member 110 when the base member 110 is in contact with the decking members 150, 160. The adjustable section 130 is configured to provide translation of the tool nose 145 so that the tool nose 145 may be positioned at least partially in the gap 155. The tool nose 145 may generally be biased, by, e.g., a spring, so that the tool nose 145 is not in the gap 155. The tool nose 145 may be inserted into the gap 155 by applying a force to the tool 140. In the embodiment shown in FIG. 1A, the adjustable section 130 is configured to provide a fixed angle for the tool nose 145 relative to the base member 110. In the embodiment shown in FIG. 1B, the adjustable section 130 is configured to provide an adjustable angle of the tool nose 145 relative to the base member 110. For example, the angle may be in a range of about 89 degrees to about 30 degrees relative to the base member 110. In other words, the angle may be in a range of about one degree to about 60 degrees relative to a perpendicular to the surface of the joist 180. A tool nose 145 angle perpendicular to the surface of the joist 180 may result in driving the fastener 170 into the joist 180 and not into a decking member 150, 160, when the tool nose 145 is positioned at least partially in the gap 155.

Figure 2A:
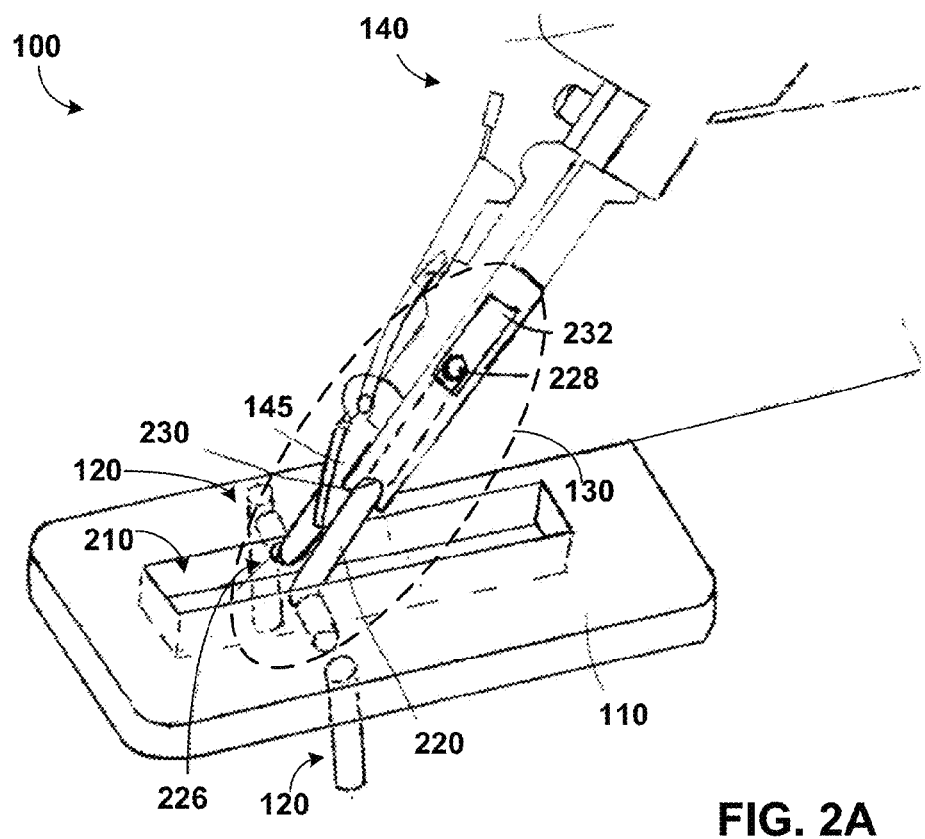
FIG. 2A is a sketch of one exemplary embodiment of a tool positioning system consistent with the present disclosure.
Figure 2B:
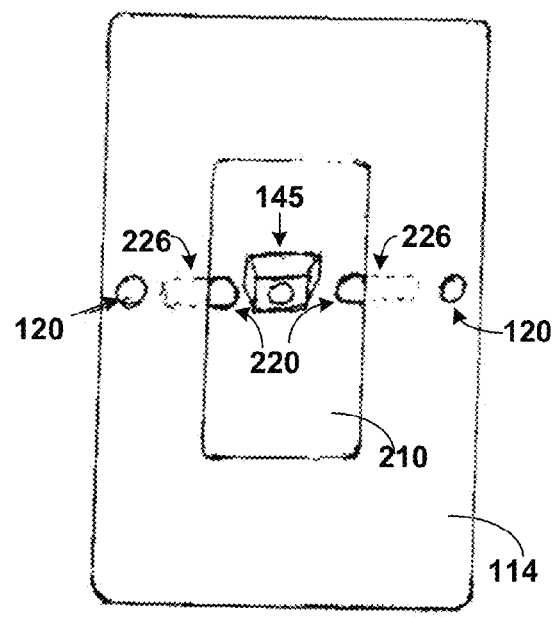
FIG. 2B is a bottom view of the exemplary embodiment of FIG. 2A.
Figure 2C:
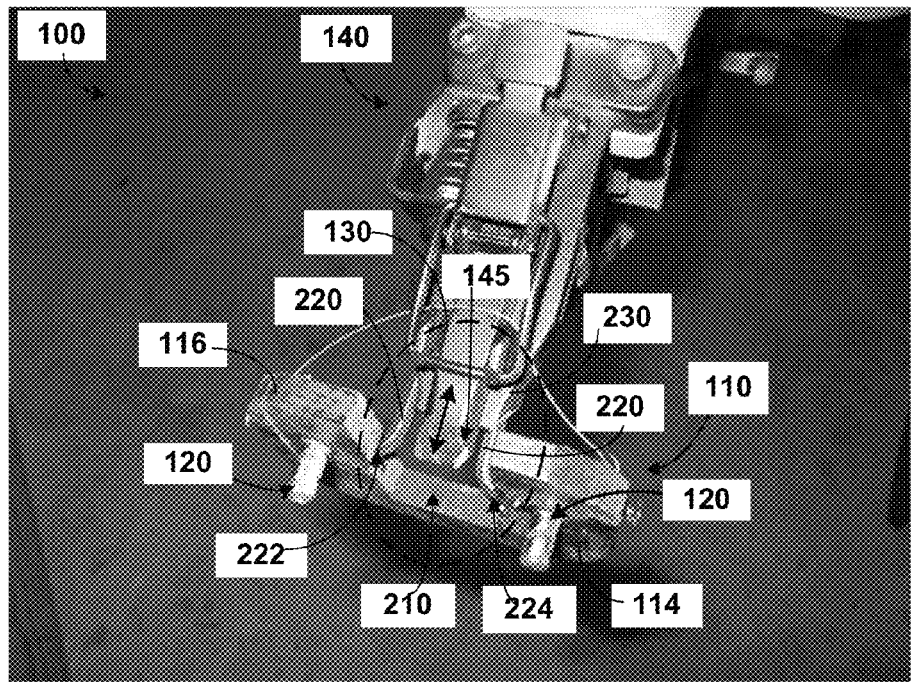
FIG. 2C is one exemplary embodiment of a tool positioning system consistent with the present disclosure.

Turning to FIGS. 2A through 2C, there is illustrated an example of a tool positioning system 100, consistent with the present disclosure. In this example, the tool positioning system 100 includes two generally cylindrical base guides 120 coupled to a second surface 114 of a generally rectangular base member 110. The base member 110 defines a generally rectangular opening 210 configured to receive the tool nose 145. The tool positioning system 100 includes an adjustable section 130, delineating in the FIGS. 2A and 2C by a dotted ellipse. Translation of the tool nose 145, i.e., adjustment of the tool nose 145 relative to the base member 110, is illustrated by a line with an arrow at each end in FIG. 2C.

Continuing with this example, the adjustable section 130 includes a plurality of pivot members, e.g., pivot shafts 220, and a plurality of corresponding shaft guides 230. The pivot shafts 220 are configured to provide rotation of the tool nose 145, i.e., adjustment of an angle of the tool nose 145, relative to the base member 110. The pivot shafts 220 may be slidably coupled to the base member 110 via pivot shaft openings 226 defined in based member 110. An axis of rotation may be defined between a first pivot point 222 and a second pivot point 224, generally parallel to the second surface 114 of the base member 110. The tool nose 145 (and tool 140) may rotate generally about this axis.

The pivot shafts 220 and the corresponding shaft guides 230 are configured to provide translation of the tool nose 145 relative to the base member 110 and thereby decking members 150, 160. For example, each pivot shaft 220 may be slidably coupled to an associated shaft guide 230. The shaft guides may be coupled to the tool 140 such that the tool 140 may move along the pivot shafts relative to the base member 110, as indicated by the double arrow in FIG. 2C. In some embodiments, the pivot shaft(s) 220 may be configured to disengage a safety feature and allow the tool 140 to drive a fastener when the tool nose 145 is moved relative to the base member 110 and contacts, e.g., the edge 152 of the first decking member 150.

In some embodiments, the shaft guides 230 may define a shaft guide opening 232 configured to allow insertion and/or removal of a pivot shaft retainer 228. The pivot shaft retainer 228 is configured to retain the pivot shaft 220 in the pivot shaft guide 230. For example, the pivot shaft retainer 228 may be a retainer clip, known to those skilled in the art.

Figure 3A:
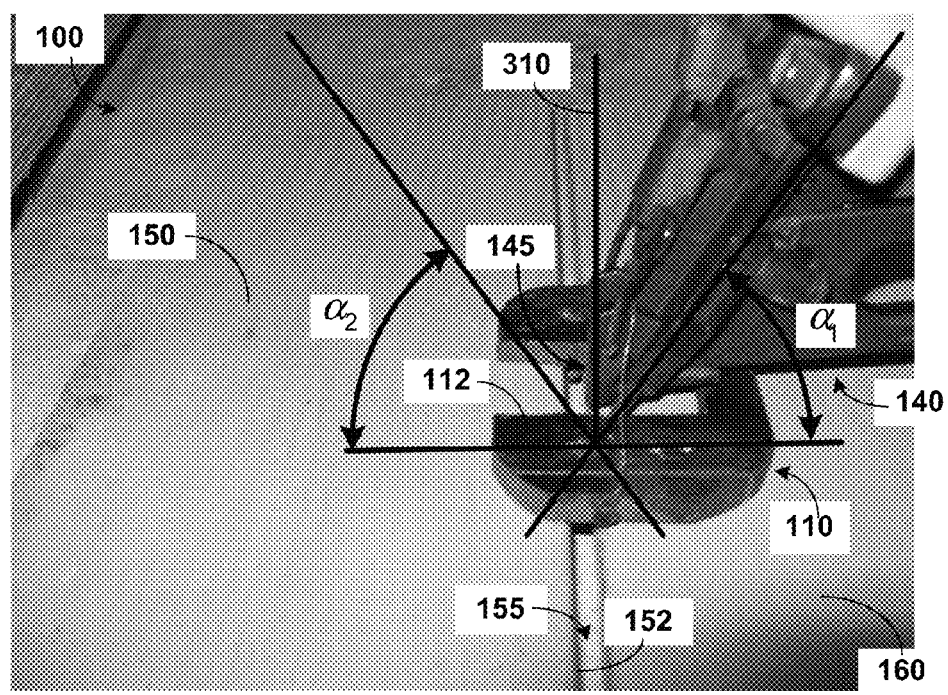
FIG. 3A is the exemplary embodiment of FIG. 2C with the tool at an angle and the tool nose adjacent to a gap.
Figure 3B:
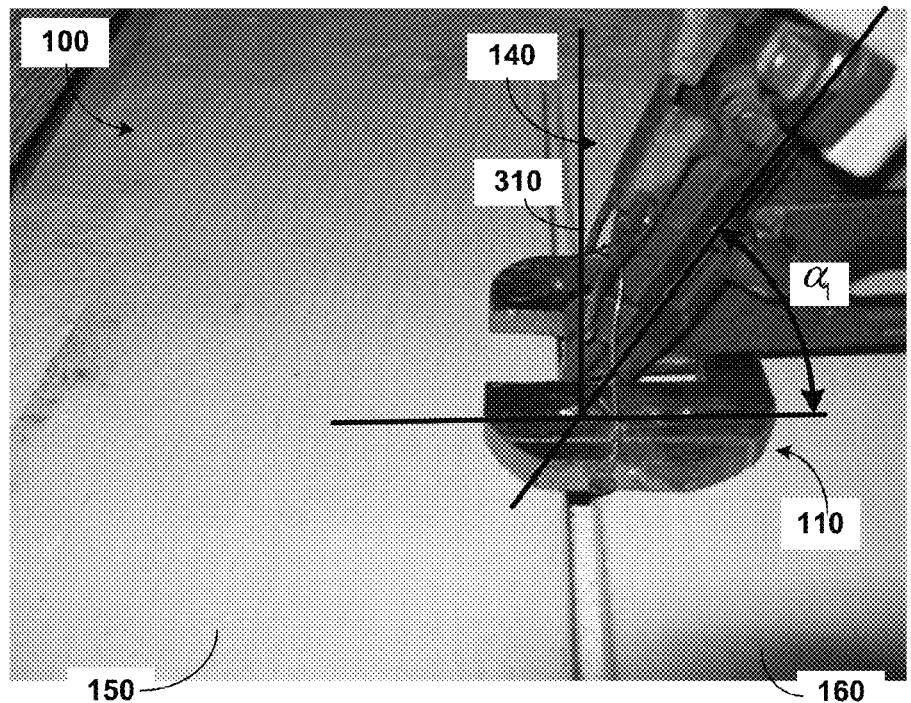
FIG. 3B is the exemplary embodiment of FIG. 2C with the tool at an angle and the tool nose partially inserted into the gap.
Figure 3C:
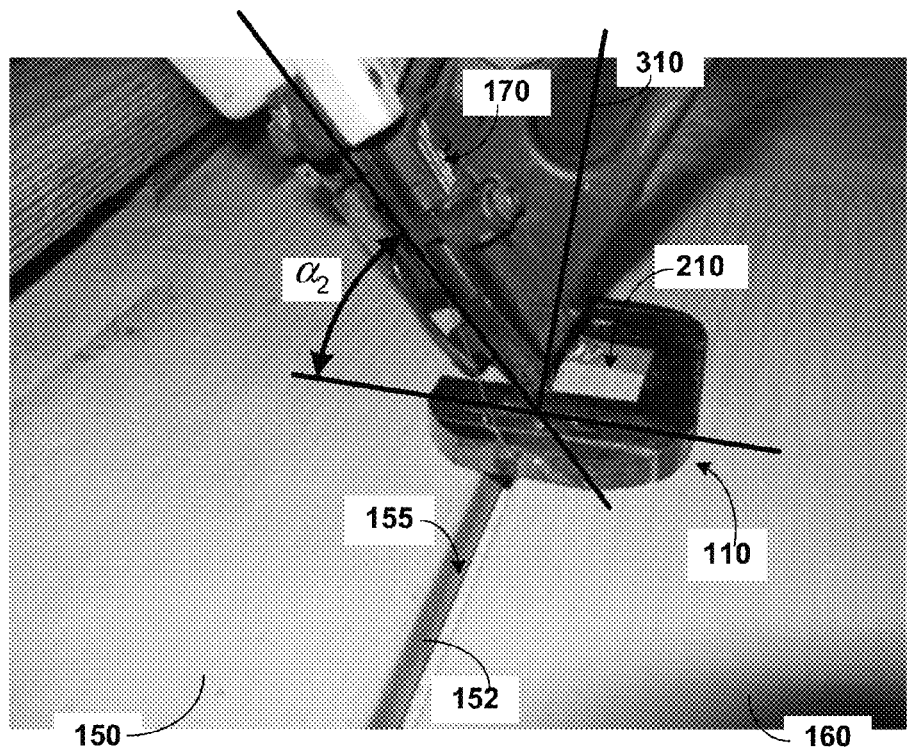
FIG. 3C is the exemplary embodiment of FIG. 2C with the tool at another angle and the tool nose partially inserted into the gap.

Turning to FIGS. 3A through 3C, there is illustrated the exemplary tool positioning system 100 of FIG. 2C with the tool 140 positioned relative to a base member 110, decking members 150, 160 and gap 155. Referring first to FIG. 3A, there is illustrated the tool 140 with tool nose 145 positioned near the gap 155. In this example, the base guides 120 are positioned at least partially in the gap 155 between the first and second decking members 150, 160, and the second surface 114 of the base member 110 is contacting the decking members 150, 160. The tool 140 and tool nose 145 are at an angle $\alpha_1$ relative to the base member 110. A reference perpendicular 310 is illustrated. The reference perpendicular 310 is relative to the first surface 112 of the base member 110 which may be generally parallel to a surface of the joist 180. The adjustable section 130 may allow rotation of the tool 140 and/or tool nose 145 to an angle $\alpha_2$ relative to the base member 110. Positioning tool 140 at angle $\alpha_1$ relative to the base member 110 may allow a fastener to be driven into the first decking member 150 while positioning tool 140 at angle $\alpha_2$ relative to the base member 110 may allow a fastener 170 to be driven into the second decking member 160.

Referring now to FIG. 3B, there is illustrated the tool positioning system 100 and the tool 140 with the tool nose 145 positioned at angle $\alpha_1$ with the tool nose 145 positioned at least partially in the gap 155, in preparation for driving a fastener 170 into the first decking member 150. Referring now to FIG. 3C, there is illustrated the tool positioning system 100 and the tool 140 with the tool nose 145 positioned at angle $\alpha_2$ with the tool nose 145 positioned at least partially in the gap 155, in preparation for driving a fastener 170 into the second decking member 160.

For example, a tool positioning system 100 may be utilized to secure one or more decking members to associated joists. The first decking member 150 and the second decking member 160 may be placed, i.e., positioned, on a plurality of joists 180. The second decking member 160 may be positioned relative to the first decking member 150, leaving a gap 155 between the decking members 150, 160. The tool positioning system 100 may then be positioned relative to the decking members 150, 160 so that the one or more guide members 120 extend at least partially into the gap 155 and the base member 110 contacts the decking members 150, 160. An angle, e.g., $\alpha_1$, between the tool 140 (and tool nose 145) and the base member 110 may be adjusted to align the tool nose 145 relative to the edge 152 of the first decking member 150. In some embodiments, the angle may be set prior to positioning the tool positioning system 100 relative to the decking members 150, 160. A position of the tool 140 may then be adjusted to position the tool nose 145 in the gap 155. In this position, the tool nose 145 may contact the edge 152 of the first decking member 150 and may disengage the safety feature and allow a fastener to be driven into the first decking member 150 and the associated joist, e.g., joist 180. The tool 140 may then be released so that the tool nose 145 exits the gap. In some embodiments the tool 140 may be rotated to a second angle, e.g., $\alpha_2$, between the tool 140 (and tool nose 145) and the base member 110. The process may then be repeated to drive a fastener into the second decking member 160. The tool positioning system 100 may then be moved to another position, e.g., another associated joist, along the decking members 150, 160 and the process may be repeated.

Accordingly, a tool positioning system, consistent with the present disclosure, is configured to position a power fastener tool to facilitate driving a fastener into an edge of a decking member and into an associated joist. The tool positioning system is configured to provide rotation and/or translation of the tool relative to decking member(s) and/or a gap between decking members. In this manner, driving fasteners during the installation of decking members may be done relatively quickly while reducing the likelihood that the fasteners will be visible after the installation.

FIG. 4A is a side view of one exemplary embodiment of a fastener being driven into a decking member via a system consistent with the present disclosure. FIG. 4B is a perspective and profile view of the fastener of FIG. 4A. In the illustrated embodiment, fastener 402 may include a fastener tip 404 configured to pierce a decking member 150 and subsequently secure the decking member 150 to a joist (not shown). Although not shown, the fastener may include a head portion and a body portion. Those skilled in the art will recognize that the fastener tip 404 may be configured for use with any type of material including wood, composite materials, concrete, metal, plastic, textiles and other materials. Those skilled in the art will also recognize that embodiments of fasteners described herein may be driven into a material by a power fastener tool via a tool positioning system consistent with the present disclosure.

As shown in FIG. 4B, the fastener tip 404 may include a recessed portion 406 forming a first point 408 and a second point 410. The recessed portion 406 may be in the form of a channel having a generally arcuate shape. In other embodiments, the channel may have a v-shape. The first and second points 408, 410 may be configured to pierce the decking member 150 and guide the fastener 402 into the decking member 150. The first and second points 408, 410 may be configured to reduce force required to overcome resistance from the decking member 150 upon the fastener 402. The first and second points 408, 410 may further be configured to prevent and/or reduce the decking member 150 from splitting when the fastener 402 is driven in.

The fastener tip 404 may be configured to be bidirectional, wherein the fastener 402 may be driven into the decking member 150 at a first angle and/or a second angle. The fastener 402 may be configured to be driven by a power fastener tool via a tool positioning system consistent with the present disclosure. For example, according to one embodiment of the present disclosure, the fastener 402 will be driven into an edge 152 of the decking member 150 at an angle relative to a perpendicular defined relative to a surface of the joist. In the illustrated embodiment, the first point 408 of the fastener 402 may initially make contact with the edge 152 of the decking member 150. The first point 408 may be configured to initially pierce the decking member 150 and guide the fastener 402 into the decking member 150 at the desired angle. In another embodiment, the fastener 402 may be driven into an edge of second decking member (not shown) adjacent to decking member 150 at a second angle, wherein the second point 410 may initially make contact with the edge. The second point 410 may be configured to initially pierce the decking member 150 and guide the fastener 402 into the decking member 150 at the desired second angle.

FIGS. 4C through 4E are perspective and profile views of exemplary embodiments of a fastener consistent with the present disclosure. Referring to FIG. 4C, a fastener 412 may include a bidirectional fastener tip 414 configured to pierce a decking member and subsequently secure the decking member to a joist. The fastener tip 414 may include a recessed portion 416 forming a first point 418 and a second point 420, wherein points 418 and 420 may be formed on opposing surfaces and/or portions of the fastener 412. The recessed portion 416 may be in the form of a channel having a v-shape. In the illustrated embodiment, points 418 and 420 may be bent in opposing directions. Referring to FIG. 4D, a fastener 422 may include a bidirectional fastener tip 424 configured to pierce a decking member and subsequently secure the decking member to a joist. The fastener tip 424 may include a v-notch 426 forming a first point 428 and a second point 430, wherein points 428 and 430 are formed on opposing surfaces and/or portions of the fastener 422. For example, the first point 428 may be formed on a first surface 423A of the fastener 422 and the second point 430 may be formed on an opposing second surface 423B of the fastener 422. In other embodiments, there may be multiple v-notches forming a plurality of points.

Referring to FIG. 4E, a fastener 432 may include a bidirectional fastener tip 434 configured to pierce a decking member and subsequently secure the decking member to a joist. In the illustrated embodiment, the fastener tip 434 may include a combination of a recessed portion 436 and a v-notch 437 forming at least a first point 428 and a second point 430. The recessed portion 436 may be in the form of a channel having a generally arcuate shape and/or a v-shape. Points 438 and 440 may be formed on opposing surfaces and/or portions of the fastener 432. For example, the first point 438 may be formed on a first surface 433A of the fastener 432 and the second point 440 may be formed on an opposing second surface 433B of the fastener 422.

Figure 5:
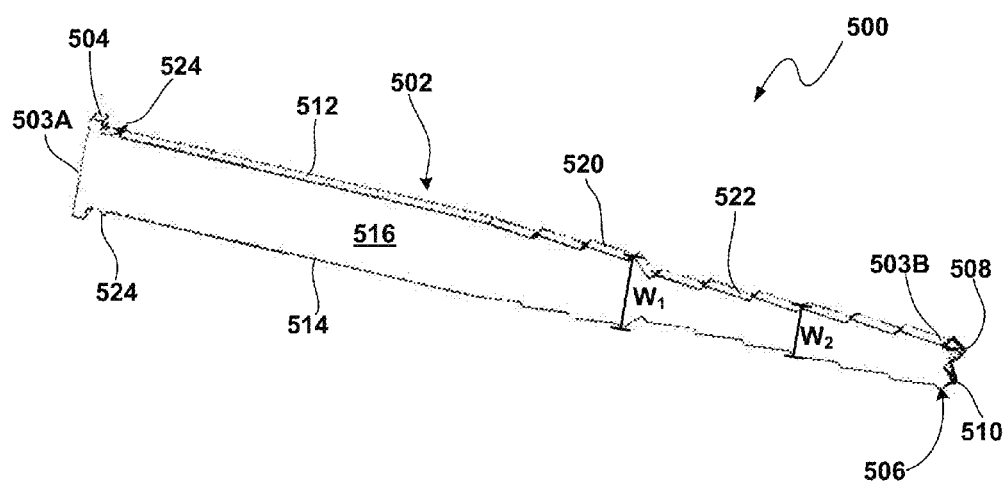
FIG. 5 is a perspective view of another exemplary embodiment of a fastener consistent with the present disclosure.

FIG. 5 is a perspective view of another exemplary embodiment of a fastener consistent with the present disclosure. In the illustrated embodiment, fastener 500 includes a body portion 502 having a first end 503A and an opposing second end 503B. The fastener 500 may further include a head portion 504 extending from the body portion 502 at the first end 503A and a tip portion extending from the body portion 502 at the second end 503B. The tip portion 506 is configured to pierce a decking member (not shown) and subsequently secure the decking member to a joist (not shown). As shown, the tip portion 506 may include at least a first point 508 and a second point 510. The first and second points 508, 510 may be configured to pierce a decking member when the fastener 500 is driven into the decking member at an angle and to guide at least the tip portion 506 and said body portion 502 of said fastener 500 into at least a portion of the decking member. The first and second points 508, 510 may be bent in opposing directions. It should be noted, in other embodiments, the tip portion 506 may include point configurations as described above in reference to FIGS. 4B-4E.

Those skilled in the art will recognize that the tip portion 506 may be configured for use with any type of material including wood, composite materials, concrete, metal, plastic, textiles and other materials. Those skilled in the art will also recognize that embodiments of fasteners described herein may be driven into a material by a power fastener tool via a tool positioning system consistent with the present disclosure.

As shown, the fastener 500 may be substantially flat having four substantially planar sides. In particular, the fastener 500 may have opposing top and bottom substantially planar sides 512, 514 and opposing left (not shown) and right 516 planar sides to form a rectangle in at least one cross-section of one embodiment. Additionally, the body portion 502 may vary in width. In particular, the body portion 502 may be tapered in a direction away from the head portion 504 and towards the tip portion 506. In the illustrated embodiment, the body portion 502 may include at least a first section 520 and a second section 522, the first section 520 having a width $W_1$ and the second section 522 having a width $W_2$, wherein width $W_1$ is greater than width $W_2$. The tapered body portion 502 may be configured to improve penetration of the decking member by the fastener 500. In particular, the tapered body portion 502 may be configured to reduce pressure exerted on the fastener 500 when the fastener 500 is driven into the decking member. The tapered body portion 502 may also be configured to provide strength at the head portion 504 to reduce the possibility of bending of the fastener 500 when the fastener 500 is driven into the decking member.

The fastener 500 may further include a set of teeth 524 extending outwardly from the body portion 502 at or near the head portion 504. The head portion 504 may have a width greater than a width of the set of teeth 524. The set of teeth 524 may be configured to exert a pulling force against a decking member material when the fastener 500 has been fully driven into the decking member.

It should be noted that, similar to the first and second points 408, 410 of fastener 402, the first and second points 418, 420, 428, 430, 438, 440, 508, 510 of fasteners 412, 422, 432, 500 respectively, may be configured to pierce the decking member and guide fasteners 412, 422, 432, and 500 into the decking member. The first and second points may also be configured to reduce force required to overcome resistance from the decking member upon the fasteners 412, 422, 432, and 500. The first and second points may further be configured to prevent and/or reduce the decking member from splitting when fasteners 412, 422, 432, and 500 are driven in.

Figure 6:
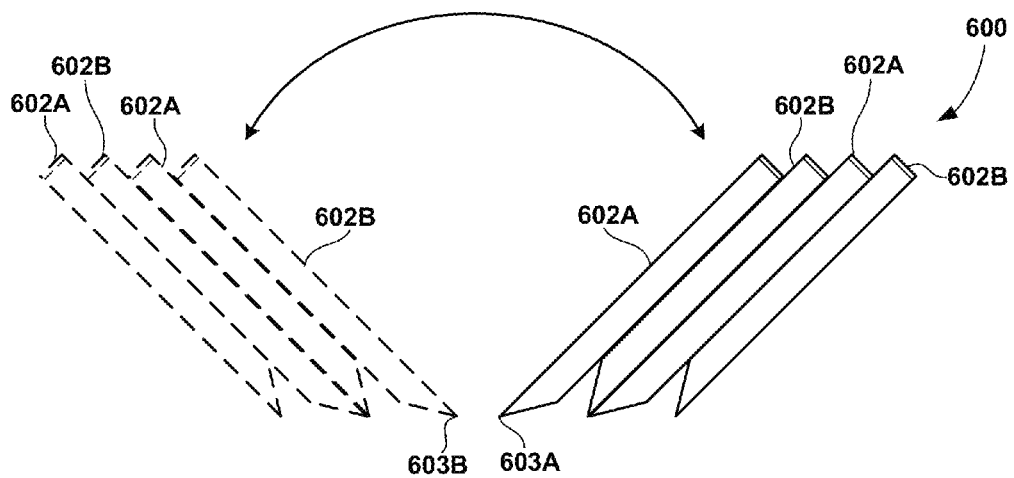
FIG. 6 is a side view of a plurality of collated fasteners consistent with the present disclosure.

FIG. 6 is a side view of a plurality of collated fasteners consistent with the present disclosure. As described above, a tool positioning system consistent with the present disclosure may include fastener system and may include a magazine of fasteners. A magazine consistent with the present disclosure may be configured to receive of plurality of collated fasteners, e.g. a collated strip 600 of fasteners. The collated strip of fasteners 600 may include a plurality of separate fasteners secured to each other, e.g. by an adhesive, wire weld, plastic, and/or paper tape, in a manner that allows separation of each fastener from the collated strip 600 as the fastener is driven by the tool. The collated strip 600 may include at least a first set of fasteners 602A and a second set of fasteners 602B. Each of the first set of fasteners 602A may include a fastener tip 603A configured to pierce a material, e.g. decking member (not shown), in a first direction. Each of the second set of fasteners 602B may include a fastener tip 603B configured to pierce a material in a second direction, wherein the second direction is generally converse with the first direction.

In the illustrated embodiment, at least some of the fasteners of the first set of fasteners 602A are positioned generally parallel to and alternating with at least some of the fasteners of the second set of fasteners 602B. The arrangement of collated fastener strip 600 illustrated in FIG. 6 may allow a user to drive a fastener from the first set 602A in one direction, such as driving a fastener into decking member 150 shown in FIG. 4A. Immediately thereafter, a fastener from the second set 602B may be driven into an adjacent decking member in the opposite direction. The collated fastener strip 600 may be configured to be used in conjunction with the rotation capability of a power fastener tool and power tool positioning system consistent with the present disclosure. As described herein, the power fastener tool may rotate, wherein rotation is configured to adjust drive angle of a fastener relative to a decking member. Rotation of the power fastener tool relative to a decking member (not shown) is indicated by the line with double-arrows.

It should be noted that each of the fasteners described herein may vary in size, shape and/or configuration. For example, the fastener may be flat, rectangle, square, round, etc. The fastener may include ringed, barbed, indented, smooth, and/or rough portions. The fastener may have a thickness and/or diameter ranging from 0.040 to 0.400 inches. The fastener may have a length ranging from 1 to 6 inches. The fasteners may include a high-strength material suitable for intended function of securing materials. For example, the fasteners may include stainless or non-stainless steel.

Accordingly, a tool positioning system, consistent with the present disclosure, is configured to position a power fastener tool to facilitate driving a fastener into an edge of a decking member and into an associated joist. The tool positioning system is configured to provide rotation and/or translation of the tool relative to decking member(s) and/or a gap between decking members. In this manner, driving fasteners during the installation of decking members may be done relatively quickly while reducing the likelihood that the fasteners will be visible after the installation.

According to one aspect, there is disclosed a fastener. The fastener may include a body portion having a first end and an opposing second end. The fastener may further include a head portion extending from the body portion at the first end and a tip portion extending from the body portion at the second end. The tip portion may include a recessed portion forming at least a first point and a second point. The first and second points may be configured to pierce a decking member and to guide at least the tip and body portions of the fastener into at least a portion of the decking member.

According to another aspect, there is provided a collated strip of fasteners, each of the fasteners configured to be driven into a decking member by a tool. The collated strip may include a first set of fasteners. Each of the fasteners of the first set may include a body portion and head and tip portions extending from opposing ends of the body portion, respectively. The tip portion may be configured to pierce and guide the fastener into the decking member in a first direction. The collated strip may further include a second set of fasteners. At least some of the fasteners of the second set are positioned substantially parallel to and alternating with at least some of the fasteners of the first set. Each of the fasteners of the second set may include a body portion and head and tip portions extending from opposing ends of the body portion, respectively. The tip portion may be configured to pierce and guide the fastener into the decking member in a second direction. The second direction may be generally converse with the first direction.

According to another aspect, there is provided a system for driving a fastener into a decking member. The system may include a tool for driving a fastener into a decking member. The system may further include a fastener configured to be driven into the decking member by the tool. The fastener may include a body portion having a first end and an opposing second end. The fastener may further include a head portion extending from the body portion at the first end and a tip portion extending from the body portion at the second end. The tip portion may include a recessed portion forming at least a first point and a second point. The first and second points may be configured to pierce a decking member and to guide at least the tip and body portions of the fastener into at least a portion of the decking member.

The system may further include a system for positioning the tool. The positioning system may include a base member configured to contact a first decking member and a second decking member. The positioning system may further include at least one base guide comprising a first end and an opposing second end. The first end may be coupled to the base member. The at least one base guide may be configured to position the base member relative to the first decking member and the second decking member. The positioning system may further include an adjustable section coupled to the base member, wherein the adjustable section may be configured to allow adjustment of at least one of a position and an angle of the tool relative to the base member.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein.

It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A fastener comprising:
a body portion having a first end and an opposing second end;
a head portion extending from said body portion at said first end; and
a tip portion extending from said body portion at said second end, said tip portion comprising at least a first point and a second point configured to pierce a decking member and to guide at least said tip and body portions of said fastener into at least a portion of said decking member,
wherein said tip portion is bidirectional, said first point being configured to pierce said decking member and guide said fastener into said decking member at a first angle and said second point being configured to pierce said decking member and guide said fastener into said decking member at a second angle.

2. The fastener of claim 1, wherein said tip portion comprises a recessed portion having said first and second points extending therefrom.

3. The fastener of claim 1, where said body portion is substantially flat and has opposing top and bottom substantially planar sides and opposing left and right substantially planar sides to form a rectangle in at least one cross-section of said body portion.

4. The fastener of claim 1, wherein a portion of said body portion tapers in a direction away from said head portion towards said tip portion.

5. The fastener of claim 4, wherein said body portion has a first section adjacent said head portion and a second section extending away from said first section and adjacent said tip portion.

6. The fastener of claim 5, wherein first section has a first width and said second section has a second width, said first width being greater than said second width.

7. The fastener of claim 6, wherein said first and second sections are configured to reduce force required to overcome resistance of said decking member and to reduce pressure exerted on said fastener by said decking member when said fastener is driven into said decking member.

8. The fastener of claim 1, wherein said body portion comprises a set of teeth extending outwardly from said body portion adjacent said head portion.

9. The fastener of claim 8, wherein said set of teeth are configured to exert a pulling force against said decking member when said fastener is driven into said decking member.

10. The fastener of claim 1, wherein said fastener is configured to be driven into said decking member by a tool for driving said fastener via a tool positioning system.

11. A collated strip of fasteners, each of said fasteners configured to be driven into a decking member by a tool, said collated strip comprising:
a first set of fasteners, each of said fasteners having a body portion and head and tip portions extending from opposing ends of said body portion, respectively, said tip portion being configured to pierce said decking member and guide said fastener into said decking member in a first direction; and
a second set of fasteners, each of said fasteners having a body portion and head and tip portions extending from opposing ends of said body portion, respectively, said tip portion being configured to pierce said decking member and guide said fastener into said decking member in a second direction, wherein at least some fasteners of said second set are positioned substantially parallel to and alternating with at least some fasteners of said first set;
wherein said second direction is generally converse with said first direction.

12. A system for driving a fastener into a decking member, said system comprising:
a tool for driving a fastener into a decking member;
a fastener configured to be driven into said decking member by said tool, said fastener comprising:
a body portion having a first end and an opposing second end;
a head portion extending from said body portion at said first end; and
a tip portion extending from said body portion at said second end, said tip portion comprising a recessed portion forming at least a first point and a second point, said first and second points being configured to pierce a decking member and to guide at least said tip and body portions of said fastener into at least a portion of said decking member; and
a system for positioning said tool, said positioning system comprising:
a base member configured to contact a first decking member and a second decking member;
at least one base guide comprising a first end and an opposing second end, said first end coupled to said base member, said at least one base guide configured to position said base member relative to said first decking member and said second decking member; and
an adjustable section coupled to said base member, said adjustable section configured to allow adjustment of at least one of a position and an angle of said tool relative to said base member.

13. The system of claim 12, wherein said adjustable section comprises at least one pivot shaft and at least one corresponding shaft guide slidably coupled to said at least one pivot shaft, said at least one pivot shaft configured to pivot about a pivot point allowing adjustment of said angle of said tool relative to said base member, said at least one corresponding shaft guide configured to allow adjustment of said position of said tool along said at least one pivot shaft, relative to said base member.

14. The system of claim 12, wherein said angle is between a range of 30 degrees and 89 degrees.

15. The system of claim 12, wherein a portion of said body portion tapers in a direction away from said head portion towards said tip portion.

16. The system of claim 15, wherein said body portion has a first section adjacent said head portion and a second section extending away from said first section and adjacent said tip portion.

17. The system of claim 16, wherein first section has a first width and said second section has a second width, said first width being greater than said second width, wherein said first and second sections are configured to reduce force required to overcome resistance of said decking member and to reduce pressure exerted on said fastener by said decking member when said fastener is driven into said decking member.

18. The system of claim 12, wherein said body portion of said fastener comprises a set of teeth extending outwardly from said body portion adjacent said head portion, wherein said set of teeth are configured to exert a pulling force against said decking member when said fastener is driven into said decking member.

19. The system of claim 12, further comprising a collated strip of fasteners, each of said fasteners configured to be driven into said decking member by said tool, said collated strip comprising:
- a first set of fasteners, each of said fasteners having a body portion and head and tip portions extending from opposing ends of said body portion, respectively, said tip portion being configured to pierce said decking member and guide said fastener into said decking member in a first direction; and
- a second set of fasteners, each of said fasteners having a body portion and head and tip portions extending from opposing ends of said body portion, respectively, said tip portion being configured to pierce said decking member and guide said fastener into said decking member in a second direction, wherein at least some fasteners of said second set are positioned substantially parallel to and alternating with at least some fasteners of said first set;
- wherein said second direction is generally converse with said first direction.

\* \* \* \* \*